United States Patent Office 3,508,114
Patented Apr. 21, 1970

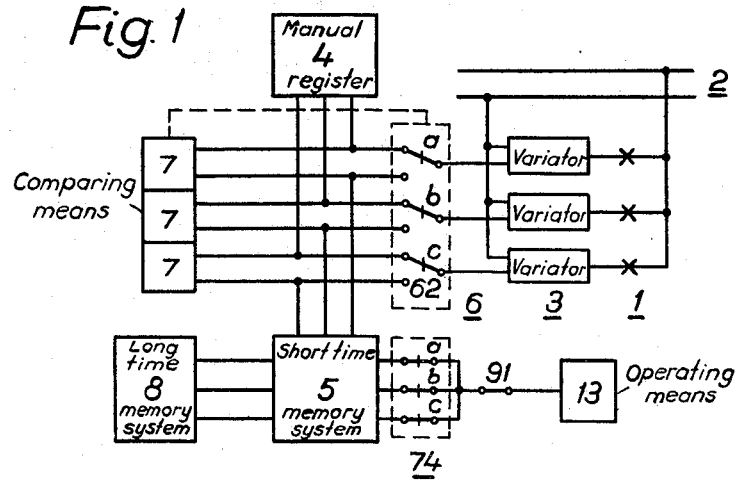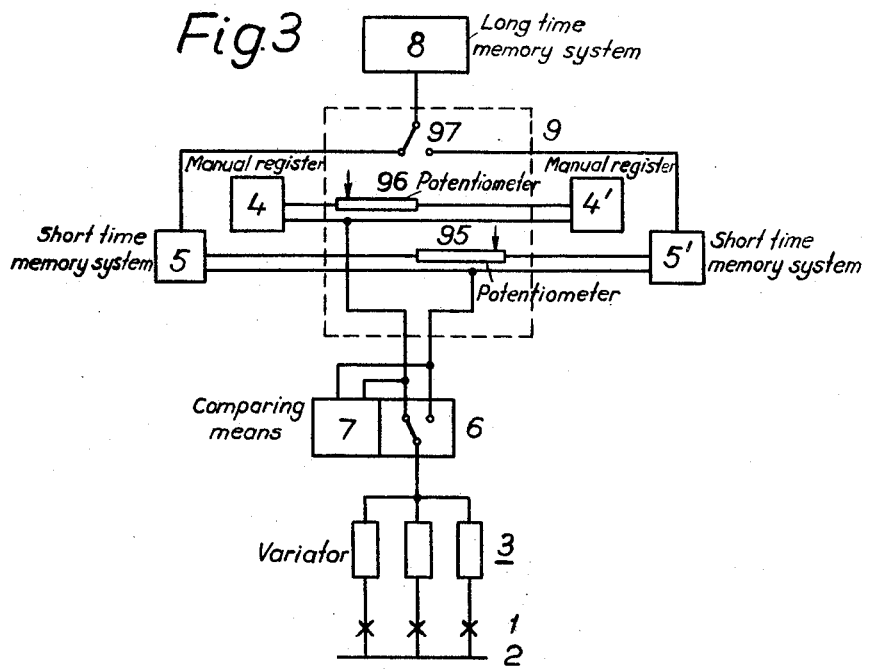

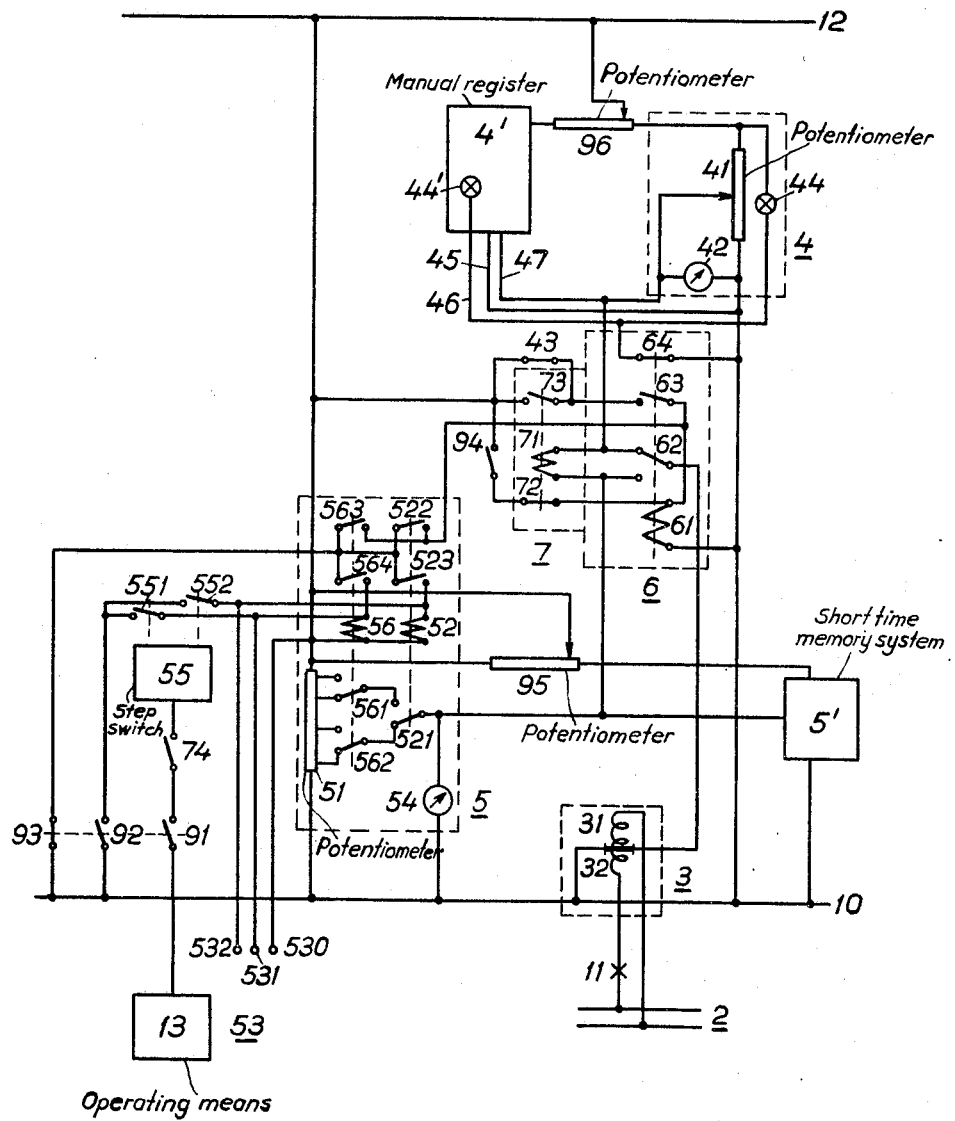

3,508,114
AUTOMATIC PROGRAM CONTROLLED STAGE LIGHTING SYSTEM
Sven-Erik Johansson, Tage Gustafsson, and Stig Norback, Vasteras, Sweden, assignors to Allmänna Svenska Elektriska Aktiebolaget, Vasteras, Sweden, a Swedish corporation
Filed July 22, 1968, Ser. No. 746,336
Claims priority, application Sweden, July 25, 1967, 10,818/67
Int. Cl. G05f 1/00; H05b 37/02, 39/04, 41/36
U.S. Cl. 315—292                 8 Claims

ABSTRACT OF THE DISCLOSURE

An automatic program control system for a stage lighting system which contains a number of individually controllable light circuits and a remote control arrangement for varying the light provided by each circuit has a manual register with controlled circuits for each light varying means so that the light varying means can be preset with desired light values. A short time memory has at least one memory circuit for each light varying means and a step switch for each memory circuit for setting a certain output signal therefrom. A long time memory system can be connected to the step switch of the short time memory system so as to receive and record signals or to furnish recorded signals. There is a common operating means for the step switches of the memory circuits. The control signal of the light varying means set in the manual register is compared with the output signal set with the step switch of the corresponding short time memory circuit and the light varying means is switched over from the manual register to the short time memory in response to the output of the comparing means.

BACKGROUND OF THE INVENTION

Field of the invention

The present invention relates to an automatic program controlled system for a stage lighting system comprising a number of individually controllable light circuits with at least one remote controlled control means, a so-called light variator, for each light circuit.

The prior art

For the purpose of arranging rapid and exact control of a great number of light circuits in a stage lighting system, many forms of automatic program control means for such light systems already exist, which are composed of mechanically controlled systems of complicated electrical constructions. In U.S. Patent No. 3,265,932 a purely electric automatic program control system is described based on a manually controlled dimmer-register, and the present invention relates to a further development of the system according to said patent.

SUMMARY OF THE DISCLOSURE

The present invention is also based on a manually controlled dimmer-register with at least one control circuit for each light variator, which circuits are provided for delivering control signals to the light variators for adjusting these variators according to desired light values. Further, the system includes a short time memory system with at least one memory circuit for each light variator and a step-switch for each memory circuit for its adjustment with a certain output signal and a long time memory system, preferably a punch card system, with a capacity at least corresponding to the product of the number of step switches and steps in the short time memory system. The step switches of the short time memory system are connected to the long time memory system for transmission of signals from the short time memory system to the long time memory system and vice versa during recording or reproduction of a light program. A control system according to the invention is characterised in that, for a number of memory circuits in the short time memory system, it comprises a common operating means for the step-switches for these memory circuits, and for each light variator a comparing means for comparing the control signal for the variator set in the manual dimmer-register with the output signal set by the step-switch in the corresponding short time memory circuit. Further there is a switching means controlled by said comparing means for switching over said light variator from the manual register to the short time memory circuit at the same time that the proper step-switch is disconnected from the common operating means.

Compared with above mentioned patent the present invention involves the simplification that there is no common sensitive means for the light variators so that according to the invention the light variators are switched over from the manual dimmer register to the short time memory system simultaneously. As step-switches for the short time memory circuits could be used, for instance, binary relay combinations or electronic bistable switch connections of digital type.

BRIEF DESCRIPTION OF THE DRAWINGS

The invention will be further described with reference to the enclosed drawing where FIG. 1 shows a block scheme for a system according to the invention, while FIGS. 2 and 4 show examples of how a light variator is connected to the corresponding circuits within the other components. FIG. 3 shows a scheme for a system, where the manual dimmer-register as well as the short time memory system are doubled, said system also comprising a main desk for switching over between the double components.

DESCRIPTION OF THE PREFERRED EMBODIMENTS

Figure 4:
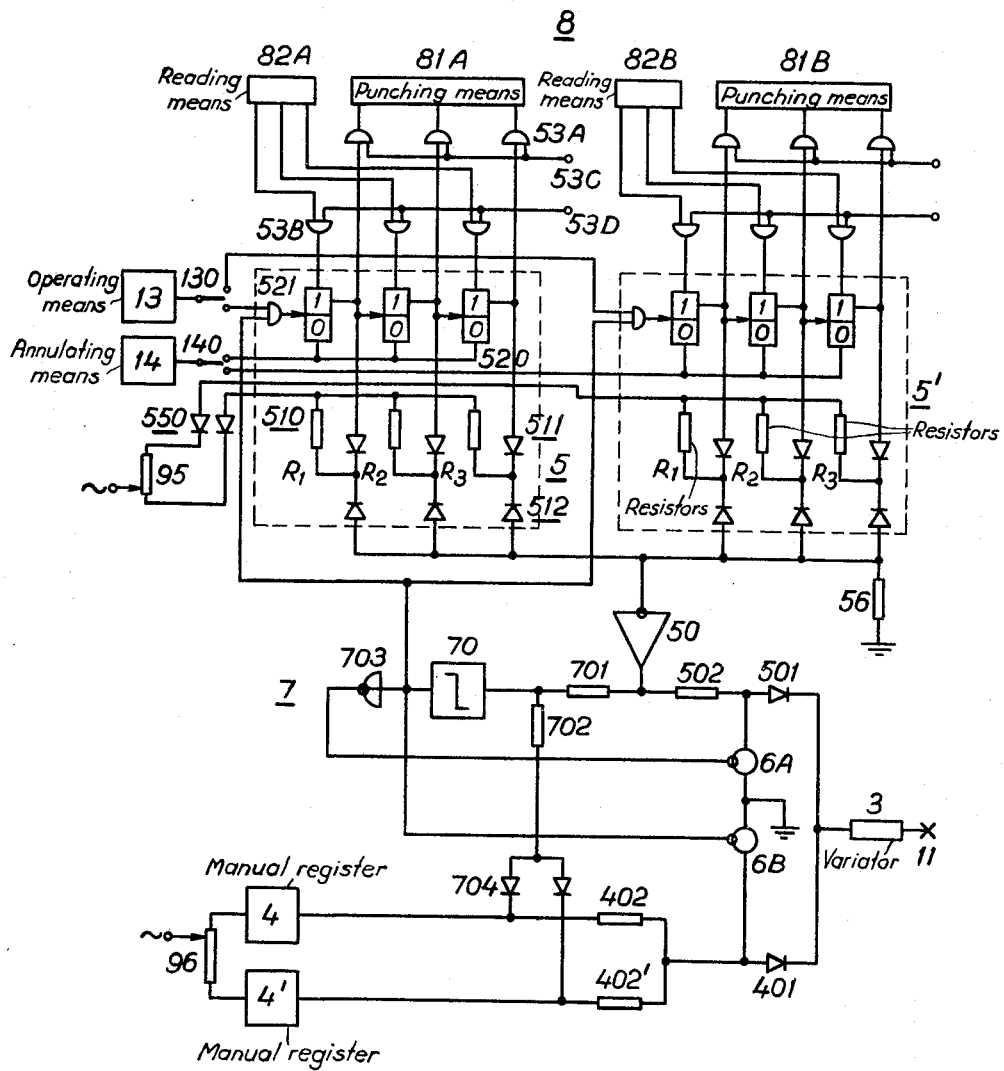

FIG. 1 shows a number of light circuits 1, fed from a network 2 and controlled each from its own light variator 3. During recording the different light variators are first connected to the corresponding control circuits in the manual register 4 by means of a switching means 6, for instance provided with two-way contacts 62a–c. When a light condition for a particular moment of the light program is set by means of the different control circuits in the manual register, the short time memory system 5 is activated by connecting the step-switches for the different circuits in this system through contacts 74a–c to a common operating means 13 for the different step-switches. For each light variator 3 there is a comparing means 7 for comparing the signal for the variator from the manual register 4 with the output signal from the corresponding short time memory circuit set by the proper step-switch 5. When said two signals are equal the step-switch for the proper memory circuit in the short time memory 5 is stopped by opening the proper contact 74 from the means 7. At the same time the light variator is switched over from the manual register 4 to the proper circuit in the short time memory 5 by means of the proper two-way contact 62. In this way all light variators are switched over almost simultaneously so that it is assured that the setting of the short time memory corresponds to that of the manual register. After this the signals of the short time memory can be recorded in a long time memory system 8, suitably a punch card system, so that the setting of the next light condition for a particular moment can be carried out in the manual register. Thus, every light condition for a particular moment will be recorded on a punch card and the different punch cards are given a number showing their place in the sequence. Thus, every light condition for a particular moment can be changed, if desired, by punching a new card to replace the earlier.

The detailed function of the system is seen from FIG. 2, having the same numbers as in FIG. 1, and showing a light group 11, fed from the network 2 through a corresponding light variator 3, which here is shown as a transductor 31 provided with a control winding 32. Instead of transductors the light variators could be constructed with various kinds of controlled elements, for instance adjustable transformers, thyristors or other elements. The control winding 32 is fed from two D.C. bars 10 and 12, over a two-day contact 62 in the switching means 6, which is shown as embodying a relay 61. By the switching of said two-way contact 62 the control winding 32 is fed from the potentiometer 41 in the manual register 4, or from the potentiometer 51 in a memory circuit in the short time memory 5, which here is constructed as a relay register 52, 56. All relays in the drawing are shown in off-position.

When beginning the setting of a light condition for a particular moment, the manual register 4 as well as the short time memory 5 normally are in their zero positions, which means that the sliding contact of the potentiometer 41 is in its lower position. A comparing means 7, comprising a relay 71, is connected across the terminals of the two-way contacts 62 in the switching means 6 to which terminals are connected the manual register 4 and the short time memory 5 respectively. Thus, the relay 71 will be in its off-position at the beginning of the setting. The potentiometer 41 is now adjusted so that the desired brightness of the lamp group 11 is obtained. This produces a voltage over the relay 71, which picks up and opens the contact 72 and closes the contacts 73 and 74. However, nothing happens at this time, as the series contacts 91 and 94 are opened and the parallel contact 43 is closed. When all lamp groups 11 are adjusted, this setting must be recorded in the short time memory 5, which is done by influencing a contact assembly 91–94, which can be done manually or over a relay connection. When the contact 91 is closed, the operating means 13, which suitably could be some kind of a pulse generator, is connected to the step-switch 55 of the short time memory which alternatingly closes and opens the contacts 551 and 552 after the principle 00–01–10–11. Thus, the relays 52 and 56 alternatingly pick up and drop out, which means that the lower terminal of the two-way contact 62 in the switching means 6 over the contacts 521, 561, 562 successively is connected to one after the other of the terminals of the potentiometer 51 in the short time memory 5. When the signal from the short time memory is equal to the signal from the manual register 41, the voltage over the relay 71 disappears so that this relay drops out. As the contact 94 is closed, the contact 72 when it is closed supplies a voltage to the relay 61 in the switching means 6, which relay picks up and switches the control winding 32 of the light variator 3 from the manual register to the short time memory. At the same time the relay 61 will have a holding circuit over the contact 63 so that the relay 61 remains in its on-position when the contact 72 is opened. Further, the relay 71 opens the contact 74 so that the step-switch 55 is disconnected from the operating mean 13 so that the step-switch is stopped.

This happens simultaneously for all light variators so that after a very short moment the contact assembly 91–94 can be released. As mentioned, the relay 61 will retain its holding circuit over the contact 63. The contact 91, which suitably can be common for all control circuits of the short time memory 5, is opened, but as the contact 74 already is opened, nothing happens as a result of this opening. When the contact 92 is opened, the contacts 551 and 552 are disconnected, but at the same time the contact 93 is closed so that those of the relays 52 and 56 which are in their on-position become a holding circuit over the corresponding holding contacts 523 and 564. Over a set of terminals 53, comprising a neutral terminal 530 and step terminals 531 and 532, the short time memory is connected to the long time memory system, for instance a punching device for a punch card system, so that the setting of the relays 52 and 56 is transmitted to a punch card. In this way the desired light program is recorded moment by moment.

For reproduction the prior punched cards are placed in the reading apparatus of the punch card system, so that the reading contacts of this system are connected to the set of terminals 53. Thus, the proper ones of the relays 52 and 56 are picked up and obtain holding circuits over the holding contacts 523 or 564, so that the punch card only has to be placed in the reading means during the setting of the short time memory 5. When the light variators during reproduction are to be connected to the short time memory, this could be done manually by moving the two-way contacts 62 to the lower position, or this could be done automatically as shown in FIG. 2.

For reproduction all circuits of the manual register 4 are set in their zero position, and, for all the light variators which have not gotten a setting during the recording, the output signal from the proper short time memory circuit will also be zero. Thus, the relay 71 will be voltageless and in its off-position, and the contact 94 is opened, the relay 61 will also be in its off-position, which means that the light circuits which are not preset will be connected to the manual register so that they are at disposal for manual controlling during the proper light condition for a particular moment. For the light circuits which are preset, however, at least one of the relays 52 or 56 will pick up so that the relay 61 will have a voltage from the contacts 522 or 563. These contacts are suitably made like impulse contacts so that the relay 61 picks up and remains in its on-position when the holding contact 63 is closed. In this way only the preset light groups are connected to the short time memory, while the other light groups, as mentioned, are available for manual control.

If, during a performance, it is desired to take over a preset light circuit for manual control, this can be done by means of the contact 43, which is opened and for this purpose suitably placed adjacent to the proper potentiometer in the manual register. As the manual register is in its zero position while the proper circuit in the short time memory system gives a signal to the light variator, the relay 71 picks up and closes the contact 73 in series with the holding contact 63 for the relay 61. By means of the voltmeters 54 and 42 the voltages over the potentiometers 51 or 41 are indicated and by means of this the potentiometer 41 can be adjusted until its signal corresponds to the signal from the potentiometer 51. When this happens the relay 71 drops out and opens the contact 73 so that the relay 61 drops out and switches over the light variator from the short time memory to the manual register so that the light variator is available for manual control. Thus, in a very simple way a light circuit could be taken over for manual control without any twinkling.

In order to be able to know whether a light variator is connected to the manual register or the short time memory, a signal lamp 44 is arranged, for instance at the proper potentiometer 41 in the manual register. In FIG. 2 this signal lamp is controlled from the contact 64 in the relay 61 so that the lamp 44 lights when the relay 61 is in off-position, which means that the proper light variator is connected to the manual register. In FIG. 2 is further shown how the manual register as well as the short time memory can be doubled with corresponding circuits 4' and 5', and switching over from one circuit to another is made by means of potentiometers 95 and 96. Thus, during recording of a light program, two consecutive light conditions for a particular moments can be set, each on a different one of the manual registers, and, by repeating the switching over by means of the potentiometer 96, the passing between the consecutive light conditions for a particular moments can be studied. Above all the doubling of the short time memory is of great value during reproduction, as thereby a light condition for a particular moment is first set in one short time memory, which is connected to the light groups, whereafter the consecutive light condition for a particular moment is set in the other short time memory, so that it is ready for connection by means of the potentiometer 95, whereafter the next moment is set in the first short time memory and so on. Thus the reading apparatus of the long time memory system only has to be operative during the setting of the short time memory.

In FIG. 3 is shown a block diagram for such a doubled system, where the potentiometers 95 and 96 are arranged in a main disc 9, to which the manual registers as well as the short time memories are connected. The long time memory 8 is connected alternatingly to one or the other of the short time memories 5 or 5' over a two-way contact 97.

In FIG. 4 is shown how a program controlled system according to the invention could be performed like an electronic system according to the digital principle. The manual registers 4 and 4' are activated alternatingly by means of a dimmer in the form of a potentiometer 96 and the output signal from the manual register consists of an A.C. voltage, the positive half periods of which are connected to the light variator 3 through the diode 401 for control of the light group 11. The negative half periods of the voltage from the register 4 are connected through a corresponding one of the diodes 704 to a comparing means 7 comprising a discriminator 70. Each of the short time memories 5 and 5' comprises for each memory circuit a resistor combination 510 and a step-switch in the form of a bistable switch 520. The two short time memories are connected through diodes to a dimmer which is a potentiometer 95 from which they are fed with a negative voltage over one of the diodes 550. The resistor combination 510 comprises three parallel resistors R1, R2 and R3, where R2 is half of R1, while R3 is one fourth of R1. Said resistors are connected through diodes 511 to the outputs from the bistable switches 520, while they are connected to earth over the diodes 512 and the resistor 56. The output signals from the switches are positive at off-position and negative at on-position. In this way the switches in their off-position block the diodes 512 by means of the positive voltages over the diodes 511, while the switches in on-position block the corresponding diodes 511 so that the diodes 512 are conducting. The switches 520 together with the output from the first switch are connected to the input of the next switch. Further they are controlled so that a positive impulse on the input of a switch causes a switching-over from zero to one or from one to zero. This again means that each time a switch goes back to zero its output signal becomes positive and switches over the following switch to its other position. Thus if the first switch is connected to a pulse generator 13, feeding the input of the switch with a series of pulses, the switches will be switched on and off after the binary principle 000, 001, 010, 011 and so on. By connecting the switches according to such a binary principle, the current through the resistors R1–R3 and the corresponding diode 550 is varied from zero to full current. This current gives a negative signal magnitude to an amplifier 50 from which a corresponding positive signal magnitude is obtained which is connected to the light variator through a diode 501. The connection of the manual register or the short time memories is made by means of switching gates 6A and 6B. When a light condition for a particular moment is adjusted by means of the manual register 4, this must be recorded in the short time memory, which is done by connecting the pulse generator 13 to one of the short time memories 5 or 5' by means of the two-way contact 130. Control pulses are then fed to the switching connection 520 through an and-gate 521 so that the step switch 520 stepwise increases the signal to the amplifier 50 through the resistor connection 510. As long as the output signal from the amplifier 50 is less than the signal set in the manual register 4, this latter signal through the diode 704 determine the input voltage of the discriminator 70 in the comparing means 7. The discriminator 70 is so constructed that a negative voltage on its input side causes an output signal from the discriminator, while a positive or zero input voltage gives no output signal. The signal over the diode 704, is, as earlier mentioned, negative and this negative signal is transformed in the discriminator into an output signal, which on the one hand is connected to the and-gate 521 and keeps this open for the signal from the pulse generator 13. On the other hand, the output singal from the discriminator 70 is connected to the switch gate 6B, which is constructed like a short circuiting means, which is disconnected by the output signal from the discriminator 70. Further, the output signal from the discriminator 70 passes a signal transformer 703 of such a kind that no signal is given from this to the switching gate 6A, so that this gate short circuits the output signal from the amplifier 50 over the resistor 502. When the signal from the amplifier 50 is equal to the signal from the manual register 4, the input voltage to the discriminator 70 will be zero, so that the output signal from this discriminator is cancelled. Thus, the signal to the and-gate 521 is cancelled so that this gate is blocked and the step-switch 520 stops. Further, the signal to switching gate 6B is cancelled, which thus will be conducting and short circuit the voltage from the manual register 4 over the resistor 402. As the signal to the signal transformer 703 is cancelled, this signal transformer gives an output voltage to the switching gate 6A, which then is disconnected so that the output voltage on the amplifier 50 is connected over the resistor 502 and diode 501 to the light variator 3. If then the and-gates 53A are activated by a voltage on the terminal 53C, the setting of the switch connection is transmitted to a punching means 81A in the long time memory.

For reproduction of a light program, the switch connection is connected to reading means 82A in the long time memory by activating the and-gates 52B by means of voltage on the terminal 53D. At the same time the short time memory 5' is connected to a reading means 82B in the long time memory, so that the next light moment is set in 5', so that this light condition for a particular moment is ready for connection by means of the dimmer 95. Since the contact of the dimmer 95 is moved to its upper position, so that the short time memory 5' is connected, the step switch 520 in the memory 5 is neutralized by means of zero setting means 14, which is connected to all the bistable switches over the two-way contact 140.

Just as in FIG. 2 a program controlled light variator in the described connection can be taken over for manual control during performance. As earlier mentioned, the manual register normally is neutralized during performance so that the amplifier 50 is determinative of the input voltage of the discriminator 70. If now the voltage of a circuit in the manual register is increased, this voltage at a certain moment exceeds the voltage from the amplifier 50 so that the manual controlled circuit will determine the input voltage for the discriminator 70, which then switches over the switching gates 6A and 6B. As it is the greater of the voltages from the manual register and the short time memory which determines the signal of the discriminator 70, the proper circuit of the short time memory will then be neutralized to secure full freedom in the manual control.

What is claimed is:

1. Automatic program control system for a stage lighting system comprising a number of individually controllable light circuits with at least one electrically remote controlled light variator for each light circuit and a manual register with at least one control circuit for each light variator which control circuits are provided with means for delivering control signals to the light variators for presetting these with desired light values, a short time memory with at least one memory circuit for each light variator and a step-switch for each memory circuit for setting a certain output signal of said memory circuit, and a long time memory system with a capacity at least corresponding to the product of the number of step-switches and the steps in the short time memory, means for connecting the step-switches of the short time memory to the long time memory for transmitting signals from the short time memory to the long time memory and vice versa during recording and reproduction respectively, in which the system for a number of memory circuits in the short time memory comprises a common operating means for simultaneously operating the step-switches of these memory circuits and for each light variator a comparing means for comparing the control signal of the variator set in the manual register with the output signal set with the step-switch of the corresponding short time memory circuit and a switching means controlled from said comparing means for switching over the corresponding light variator from the manual register to the short time memory.

2. Automatic program control system according to claim 1 in which means is provided to take over a light variator controlled from the short time memory for manual control from the manual register, and in which a comparing means is arranged to compare the control signal in the short time memory with a control signal for the light variator set in the manual register and includes switching means responsive to equality between said two control signals to switch over the light variator from the short time memory to the manual register.

3. Automatic program control system according to claim 2, in which said comparing means is used during recording as well as when switching over a light variator from the short time memory to the manual register.

4. Automatic program control system as claimed in claim 1, which includes means operable during reproduction to connect the light variators being programmed which have the light value zero to the manual register.

5. Automatic program control system as claimed in claim 1, wherein for recording light conditions for a plurality of moments for each light circuit at least two short time memories are arranged to program a common long time memory and to reproduce the signals from this long time memory, the different short time memories being arranged to register alternately successive light conditions for the particular moments, a switching means being arranged to connect alternately the one or the other of the two short time memories during reproduction.

6. Automatic program control system according to claim 1, in which each memory circuit in the short time memory comprises a potentiometer with a number of output terminals, while the step-switch comprises a binary relay combination.

7. Automatic program control system according to claim 1, in which the short time memory comprises a digital-analog transformer, while the step-switch comprises an electronic bistable switch connection for said transformer.

8. Automatic program control system according to calim 1, in which for each light variator a signal lamp is arranged and controlled by the corresponding switching means for indicating whether the variator is connected to the manual register or the short time memory.

References Cited

UNITED STATES PATENTS

| | | | |
|---|---|---|---|
| 2,180,764 | 11/1939 | Nessel | 315—293 |
| 2,233,808 | 3/1941 | Burke | 315—293 |
| 3,221,214 | 11/1965 | Wolff et al. | 315—292 |
| 3,265,932 | 8/1966 | Pettersson et al. | 315—292 |
| 3,408,537 | 10/1968 | Wiley | 315—313 |
| 3,448,338 | 6/1969 | Bentham et al. | 315—295 |

JOHN W. HUCKERT, Primary Examiner

S. BRODER, Assistant Examiner

U.S. Cl. X.R.

315—295, 297, 301, 320, 323